E. H. GOLD.
HEATING AND VENTILATING SYSTEM.
APPLICATION FILED AUG. 17, 1909.
995,403.
Patented June 13, 1911.
5 SHEETS—SHEET 1.
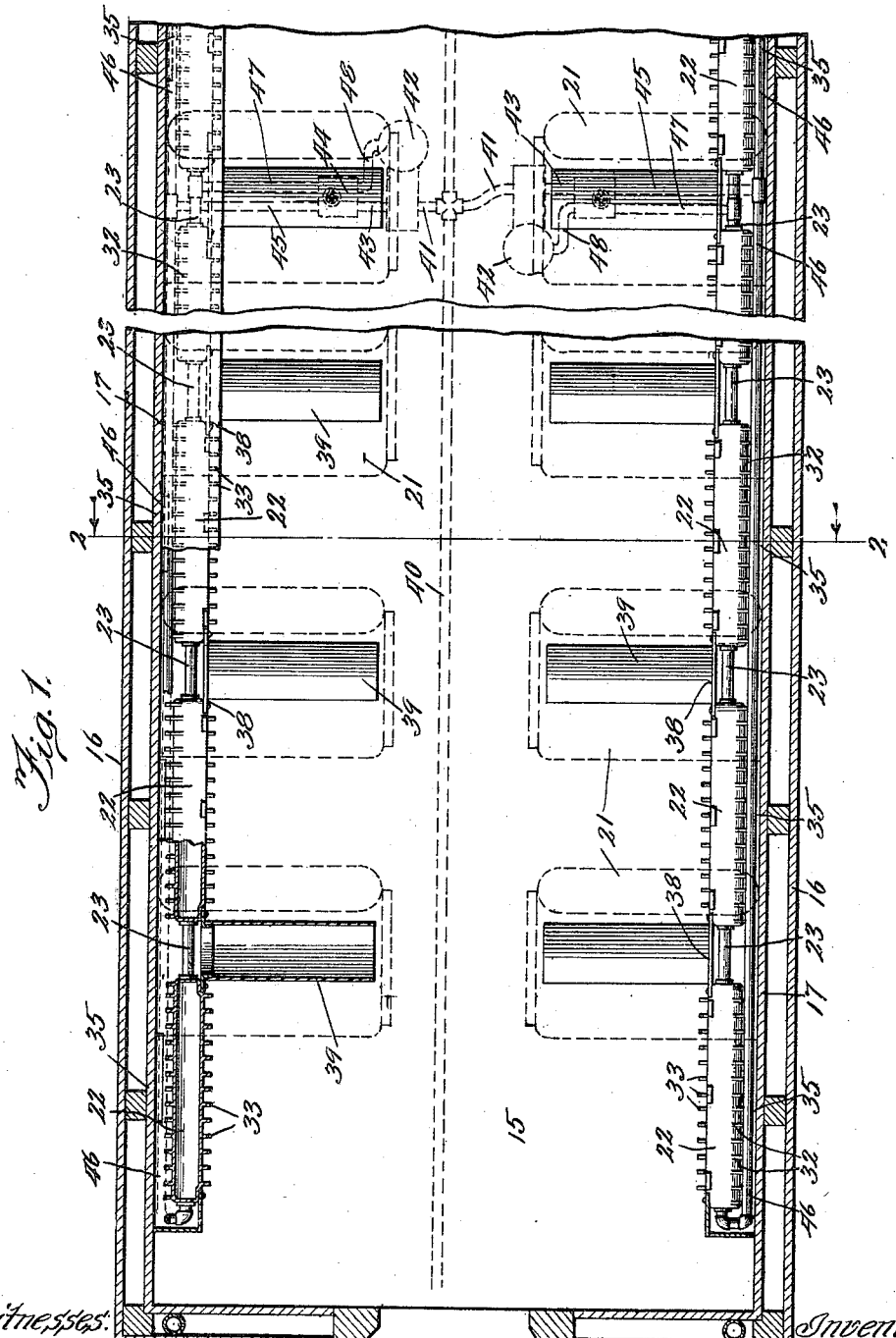

E. H. GOLD.
HEATING AND VENTILATING SYSTEM.
APPLICATION FILED AUG. 17, 1909.
995,403.
Patented June 13, 1911.
5 SHEETS—SHEET 2.
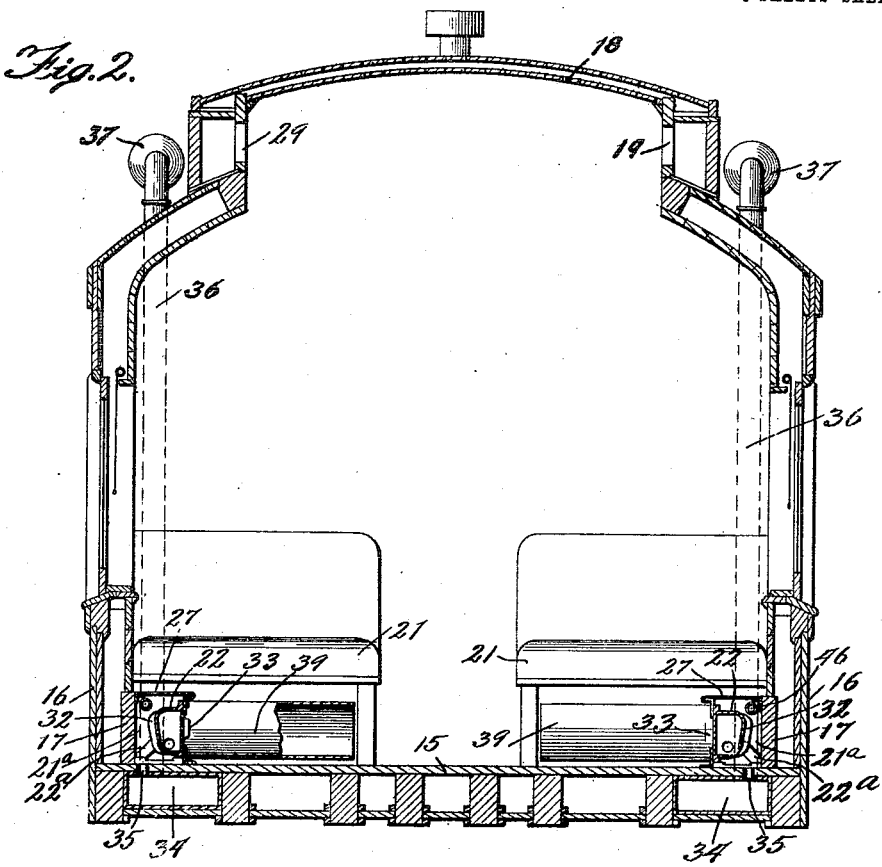
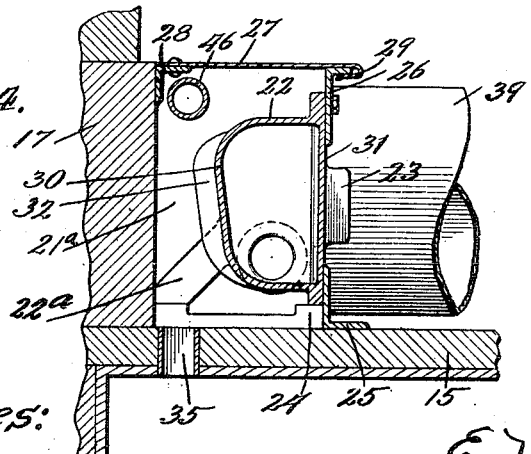

E. H. GOLD.
HEATING AND VENTILATING SYSTEM.
APPLICATION FILED AUG. 17, 1909.
995,403.
Patented June 13, 1911.
5 SHEETS—SHEET 3.
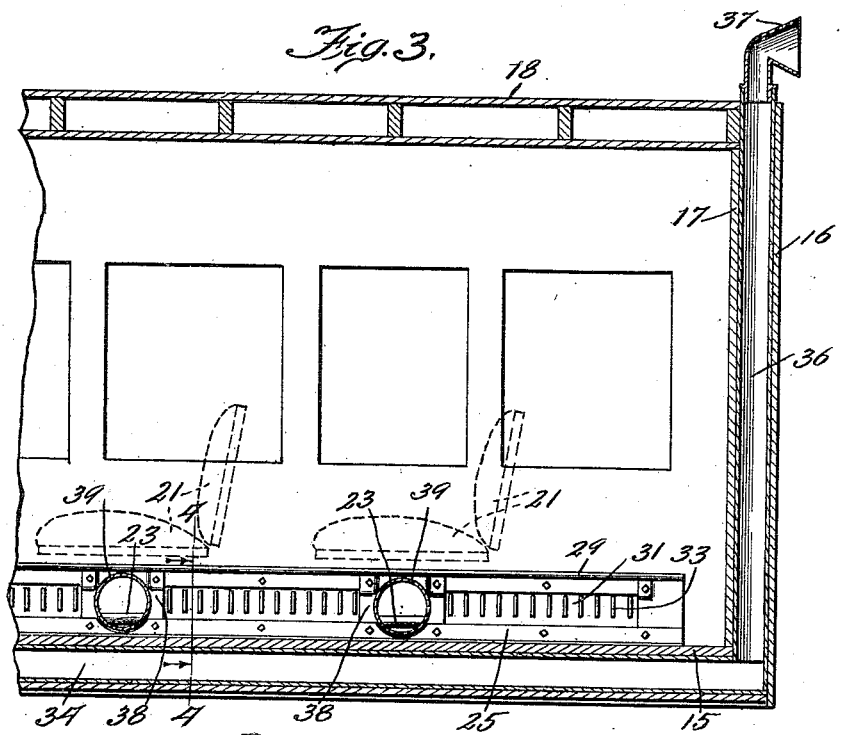
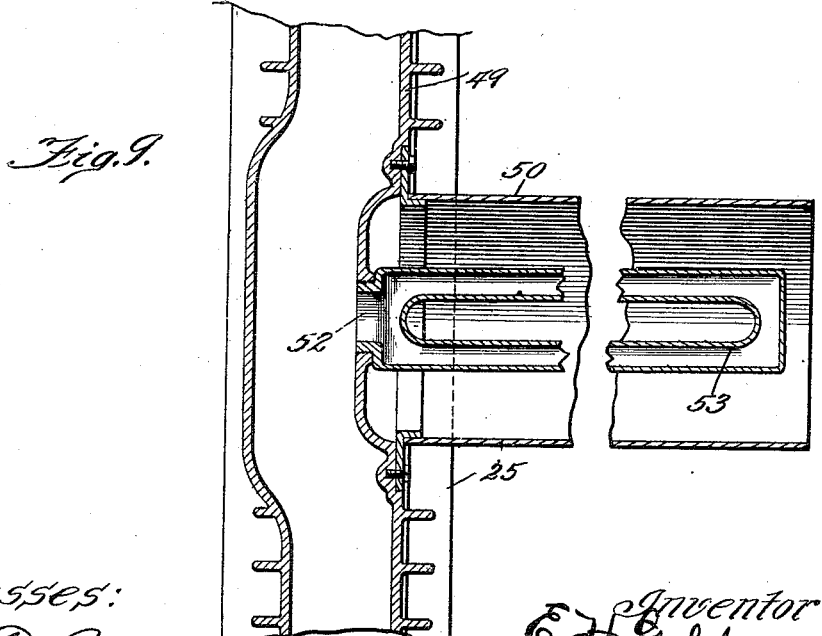

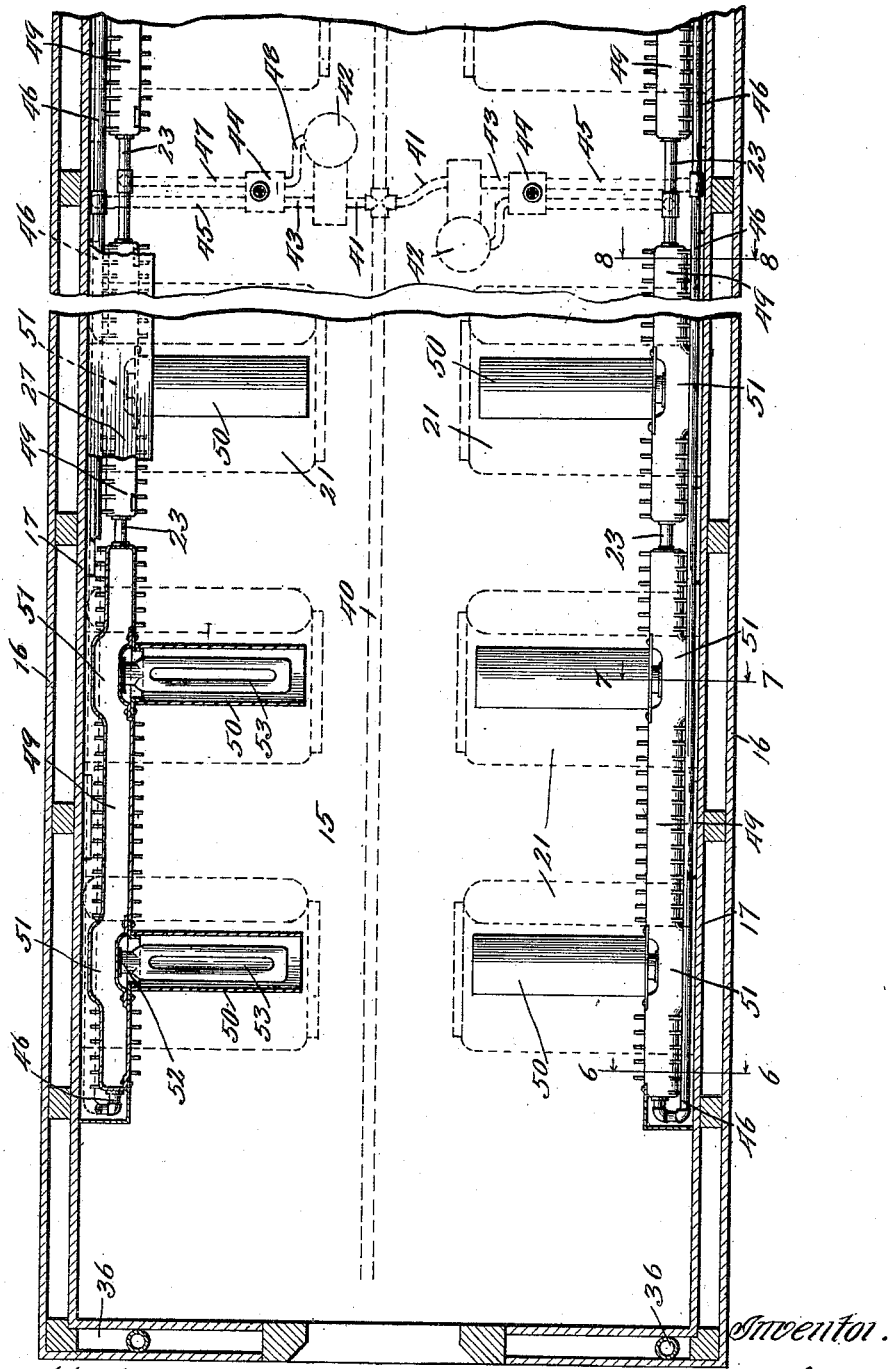

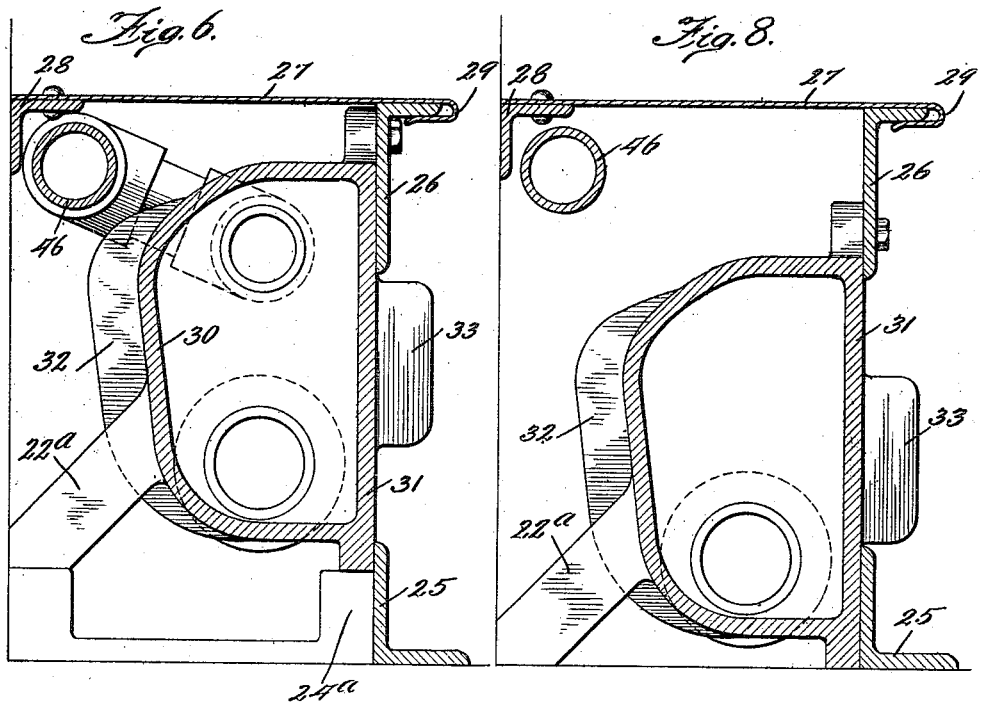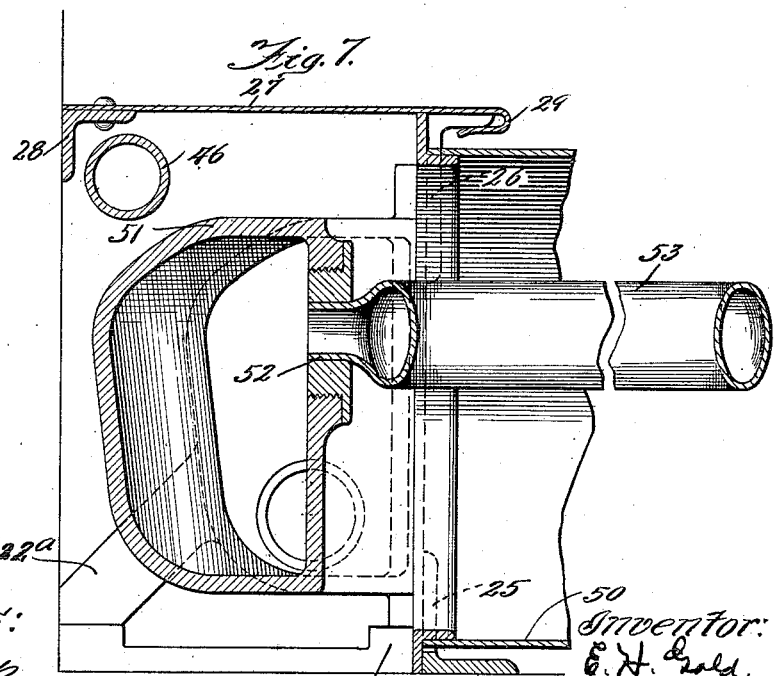

UNITED STATES PATENT OFFICE.

EGBERT H. GOLD, OF CHICAGO, ILLINOIS.

HEATING AND VENTILATING SYSTEM.

995,403. Specification of Letters Patent. Patented June 13, 1911.

Application filed August 17, 1909. Serial No. 513,282.

*To all whom it may concern:*

Be it known that I, EGBERT H. GOLD, a citizen of the United States, residing at Chicago, in the county of Cook and State of Illinois, have invented certain new and useful Improvements in Heating and Ventilating Systems, of which the following is a specification.

My invention relates to a heating and ventilating system intended particularly for railway passenger cars, and has for its object to provide certain new and useful improvements in the devices, constructions and arrangements of the type of heating and ventilating system which introduces fresh air into the car from outside the same, heats the air so introduced and circulates it through the car, whereby, according to my improvement, the heat is more evenly distributed in the car, and whereby, generally speaking, the car is more suitably, uniformly and effectively heated than in the systems of this character which have heretofore been used.

It has been customary, to take one example of an indirect car heating system, to provide a railway car with air trunks which run along the sides of the car under the seats and are supplied with air from outside the car, to locate within such trunks steam radiators, and to provide the trunks with discharge pipes, commonly called guns, which discharge the air heated by the radiators in the trunks into the center of the car. The car is, of course, provided with ventilators and in this way it is presumed that the car will be properly heated and ventilated. Systems of this sort, however, have been found defective in several respects. In the first place, the hot air being discharged into the center of the car tends to rise through the center of the car on its way to the ventilators, leaving the sides of the car inadequately heated. The air is discharged with considerable force through the guns and is sucked out of the ventilators also with considerable force, and the result is that currents of hot air are formed which do not reach the portions of the car that are the coldest, that is, the portions adjacent the windows. It has been found that in very cold weather, with a heating system of this sort in full operation, the sides of the car along the windows are unpleasantly cold. Furthermore, as the introduction of the heat into the interior of the car through the guns is brought about by the motion of the car, as soon as the train stops the heating system is made practically ineffective.

The principal object of my invention is to overcome these defects by supplying by direct radiation, bodies of heat which will keep the side portions of the interior of the car heated, and which because they are not dependent upon the creation of a draft, will be constant whether the train is in motion or not, and by also supplying heat, by the indirect method, toward the center of the car, but only when the train is in motion and so requires the additional heat.

The invention has for a further object to provide a new and improved form of radiator for carrying out the above objects, this radiator being constructed and arranged so as to subserve at once the purposes of direct and indirect heating.

The invention has for further objects such other new and improved constructions in heating systems and in a direct-indirect radiator for heating systems as will be described in the following specification and particularly set forth in the claims appended thereto.

The invention is illustrated in two alternative embodiments in the accompanying drawings, wherein—

Figure 1 is a fragmentary sectional plan of a passenger car, illustrating the general features of one form of my invention. Fig. 2 is a vertical sectional view taken on line 2—2 of Fig. 1, looking in the direction of the arrows. Fig. 3 a detail, longitudinal, sectional view illustrating the construction of the air trunk and radiator. Fig. 4 a vertical sectional view taken on line 4—4 of Fig. 3. Fig. 5 a view similar to Fig. 1, illustrating a modified embodiment of the invention. Figs. 6, 7 and 8 sectional views taken on lines 6—6, 7—7 and 8—8 respectively of Fig. 5, looking in the direction of the arrows, and Fig. 9 a sectional plan showing in detail the construction of the form of radiator employed in this modification.

Like characters of reference indicate like parts in the several figures of the drawings.

Referring first to Figs. 1 to 4 inclusive, 15 represents the floor of a railway passenger car of ordinary construction, 16 the outer walls of the car, 17 the inner sheathing, 18 the roof of the car in which are the customary ventilators 19 and 20, and 21 the seats.

Air trunks 21ª are provided along the sides of the car under the seats in which are located the direct-indirect radiators of my invention. One suitable construction of these devices is shown in the first four figures. The radiator consists of a series of radiator sections 22 which are joined together by the nipples 23. These radiator sections rest upon the blocks 24 and against the lower angle bar 25 and are bolted to the upper angle bar 26. The sections may be cast with the integral legs 22ª. The top of the trunk or passage way so formed is closed by the sheathing 27 which is riveted to the angle bar 28 and has its edge turned over to form the hook 29 which extends around and forms a slip joint with the horizontal flange of angle bar 26. This slip joint accommodates for the difference in expansion of the radiator and angle bar 26, which are cast or otherwise made of relatively heavy metal, and the sheathing 27 which is of thin sheet metal. The arrangement is such as to provide a radiating surface 30 on the radiator within the air trunk and a radiating surface 31 which is exposed to the interior of the car. The radiating surface 30 may be formed with the ribs 32 and the radiating surface 31 with the ribs 33 for the purpose of increasing radiation. It will be understood that a radiator and air trunk of this construction will be arranged on each side of the car.

Beneath the floor of the car are the cold air ducts 34 which communicate with the air trunks 21ª by slots 35 which are preferably placed about midway of the radiator sections. As will be seen from Fig. 1, there are preferably the same number of radiators as there are seats, the nipples 23 being located directly under the seats. Fresh air may be forced into the air ducts in any desired manner. For example, I may provide the air pipes 36 at each corner of the car, these pipes having funnels 37 turned toward the end of the car, so that the movement of the car in either direction forces air into the ducts. The air trunks are closed along the side by the faces 31 of the radiator except at the place where the radiators are connected by the nipples 23. At these places the trunks are closed by the plates 38 which are apertured and to which are connected the discharge pipes or guns 39 which latter extend under the seats, discharging into the aisle from either side of the car.

Heat may be supplied to the radiators from any desired source. I have shown, for example, a vapor steam system of a well known type taking steam from a train pipe which runs the length of the train and communicates with the locomotive. The train pipe is represented by 40 and from this pipe on each side, a branch pipe 41 leads to a vapor regulator 42 from whence the steam at reduced pressure is conducted through a pipe 43, the four-way valve 44 and a pipe 45 into the pipes 46 which extend in each direction from the center of the car through the air trunk 21ª and are tapped into the end radiator sections 22. The radiator drains through a pipe 47 leading from the central nipple 23 through four-way valve 44 and pipe 48 to the thermostat chamber of the vapor regulator 42; thereby controlling the admission of steam from the train pipe to the radiator in the familiar way. As the construction and arrangement of the vapor regulator and its associated parts are perfectly familiar to those skilled in this art, and as they in themselves are no part of my present invention, these devices have not been shown nor described in detail. Any other means for introducing steam or other heating medium to the radiators might be employed.

In Figs. 5 to 9 inclusive I have shown a modification relating particularly to the construction of the radiator. The apparatus above described in which there is a radiator section for every seat in the car, is a practical installation, but has this disadvantage, that it involves casting a large number of radiator sections and making an equally large number of joints between the sections. The apparatus of Figs. 5 to 9 inclusive is an improvement in this regard. In this case the radiators 49 are made of considerably greater length, and, in order to provide for the discharge of air from the trunks through the discharge pipes 50 similarly located under the seats, are cast with the off-set portions 51 (Figs. 5, 7 and 9.) The ribs 32, 33 may be omitted at these places. If desired, a radiating loop may be tapped into the radiator at each of these points and extended through the air discharge 50. I have shown (Figs. 7 and 9) the radiator formed with an aperture in which is screwed the nipple 52 of an ordinary Bundy loop 53. In this modification I have shown simple and convenient means for arranging the radiator sections so that they will drain toward the center of the car, this construction being obviously suitable as well to the arrangement of the radiators shown in the first four figures. Fig. 6, which is a section through one of the radiator sections at one end of the car, shows the radiator section bolted to the upper part of the angle bar 26. In this case the block 24ª is increased in height. Fig. 8 which is a section through one of the radiator sections in the center of the car shows the radiator section bolted to the lower edge of the angle bar 26, the block in this case being omitted. Fig. 7, which is a section through one of the radiator sections between the center of the car and the end of the car, shows the radiator section in an intermediate position in the air trunk.

This construction of the air trunk and radiator utilizes to the full the somewhat narrow space available under the seats, is a construction which, because of the slip joint between the heavier and lighter metal parts, takes care of differences in expansion, and furthermore, is one in which the parts are simple, inexpensive to make and easily assembled.

The operation of the system above described is as follows: Air from outside the car is forced through funnels 37, pipes 36, air ducts 34 and slots 35 into the air trunks 21ª, whence, passing along the radiating surfaces 30, it becomes heated and is discharged through the discharge pipes 39 and 50 into the center of the car. Space for the passage of the air into the pipes 39 of the first described apparatus is provided for by the narrowing of the steam passage at the nipples 23. The same result is obtained by the integral off-sets in the longer radiators of the modified apparatus shown in Figs. 5 to 9 inclusive. The system, so far, is an indirect heating system. A direct heating of the car which is constant whenever the radiators are under steam and not dependent upon the circulation through the car results from the exposure in the interior of the car of the radiating surfaces 31 of the radiators; and the body of heat directly radiated from the radiators at these points effectively heats those portions of the car which are difficult to reach in an indirect heating system, that is, the portions of the car along the sides adjacent the windows. It will be seen that each radiator performs two functions, first to heat the currents of air forced into the car when it is in motion, second by direct radiation to supply constant amount of heat directly to the interior of the car at the place where it is needed to supplement the indirect heating devices. It will be further noted that when there is no draft of air through the air trunk and into the car, much less radiation is required to suitably heat the car, so that under such circumstances, as for example, when the car is at rest or when the flow of air through the air trunk is shut off, the flow of direct radiation from the radiator surface exposed within the car may be of such area as to sufficiently heat the car, but when the air trunk ventilating system is utilized and a large body of cold air is introduced into the air trunk and rapidly circulated through the car, there is a much heavier tax upon the radiating system, and with my invention this is automatically provided for by the radiating surfaces which are exposed within the air trunk and therefore heats the outside air before it reaches the interior of the car.

Obviously any suitable means can be used to check or to entirely shut off the flow of air into or from the air trunk so that the radiating surfaces may be utilized to the best advantage to meet the varying conditions of external temperature.

I do not limit myself to the exact forms, constructions and arrangements shown as modifications might be devised which would come within my invention as defined by the claims.

I claim:

1. The combination with a railway car, of means constituting an air trunk and a radiator located in the car at one side thereof, said air trunk being closed on all sides except as hereinafter specified and said radiator comprising a radiating surface within the air trunk and another radiating surface exposed in the interior of the car so as to heat the same by direct radiation, a plurality of air discharge pipes leading from said air trunk at intervals along the same through which air from said trunk is discharged into the center portion of the car, and means whereby a current of air is introduced into said air trunk so as to force the heated air therein out through said discharge pipes, but only when said car is in motion.

2. The combination with a railway car, of means adapted to deliver a constant degree of heat to the interior of a car, adjacent the sides thereof, and for supplying heated air toward the center of the car in volume correspondingly varying with the speed of travel of the car.

3. The combination with a railway car, of means exposed within the car adapted to deliver a constant degree of heat to the sides of the car, and means normally operated to heat the car only when the car is in motion and arranged to provide a supply of heated air to the center of the car in volume varying according to the speed of travel of the car.

4. The combination with a railway car, of a plurality of radiator sections arranged along the side of the car and raised above the floor thereof, inclosing means which closes the space below, above and at the sides of said radiator sections but so as to leave portions of said radiator sections exposed in the interior of the car, air discharge pipes arranged at intervals so as to discharge the air from the space within said inclosing means into the center of the car, an air duct extending under the car, and means operated by the movement of the car for forcing air into said duct and from thence into said inclosed space around the radiator sections.

5. The combination with a railway car, of means constituting an air trunk located within said car, said means comprising a radiator in said trunk so arranged as to have one radiating surface exposed within the trunk and another radiating surface immediately exposed in the interior of the car so as to heat the same by direct radiation, said radiator having off-set portions, means for introducing air from outside the car into said trunk and air discharge pipes leading from the air trunk opposite the off-set portions of the radiator.

6. The combination with a railway car, of means constituting an air trunk located within said car, said means comprising a radiator in said trunk so arranged as to have one radiating surface exposed within the trunk and another radiating surface immediately exposed in the interior of the car so as to heat the same by direct radiation, said radiator having off-set portions, means for introducing air from outside the car into said trunk, air discharge pipes leading from the air trunk opposite the off-set portions of the radiator, radiating loops in said air discharge pipes which are tapped into said radiator, and means for supplying the radiator with steam.

7. The combination with a railway car, of means constituting an air trunk located within said car, said means comprising a radiator in said trunk arranged so as to have one radiating surface exposed within the trunk and another immediately exposed in the interior of the car so as to heat the same by direct radiation, said radiator composed of a plurality of radiator sections and nipples connecting the same, each radiator section consisting of a single casting provided with off-set portions, means for introducing air from outside the car into said trunk and discharge pipes leading from said air trunk opposite the off-set portions of said radiator sections.

8. The combination with a railway car, of a combined air trunk and radiator comprising radiator sections, means for connecting the same together, an angle bar which is secured to said radiator sections, and a top sheathing secured at one edge to the side of the car and having the other edge bent over so as to form a slip joint with the angle bar, said radiator sections having surfaces exposed immediately in the interior of the car so as to heat the same by direct radiation, means for introducing air from outside the car into the space inclosed by the radiator and sheathing, and means for discharging the air heated therein into the interior of the car.

9. The combination with a railway car, of a combined air trunk and radiator comprising radiator sections arranged at different heights so as to give an inclination to the radiator as a whole, means for connecting the same together, an angle bar which is secured to said radiator sections, and a top sheathing secured at one edge to the side of the car and having the other edge bent over so as to form a slip joint with the angle bar, said radiator sections having surfaces exposed immediately in the interior of the car so as to heat the same by direct radiation, means for introducing air from outside the car into the space inclosed by the radiator and sheathing, and means for discharging the air heated therein into the interior of the car.

10. The combination with a railway car, of means constituting a closed air passageway located at one side of the car, said means comprising a series of radiators arranged in said air passageway with radiating surfaces immediately exposed to the interior of the car and other radiating surfaces immediately exposed to the interior of said passageway, means for conducting a heating medium to said radiators, a series of air discharge pipes which extend from said air passageway transversely of the car between successive radiators, and means, operative only when the car is in motion, for forcing air from outside of the car into and through said air passageway and said air discharge pipes toward the center of the car, substantially as described.

11. The combination with a railway car, of means constituting an air trunk located within the same which is entirely inclosed except for one or more air inlets from outside of the car and except for a plurality of discharge openings laterally arranged at intervals along the same, said means comprising a radiator located in said trunk so as to have one radiating surface within the trunk and another radiating surface immediately exposed in the interior of the car so as to heat the same by direct radiation, and means for intermittently supplying said trunk with air under pressure from the external atmosphere; said discharge openings being so restricted in cross sectional area relative to the size of the air trunk that the escape of heat therethrough, except under pressure of air in the trunk, is inappreciable.

12. The combination with a railway car, of means constituting an air trunk located within said car having an air inlet, said means comprising a radiator in said trunk so arranged as to have one radiating surface exposed within the trunk and another surface immediately exposed in the interior of the car so as to heat the same by direct radiation, said radiator having off-set portions and air discharge pipes leading from the air trunk opposite the off-set portions of the radiator.

13. The combination with a railway car, of means constituting an air trunk located within the car having an air inlet, said means comprising a radiator in said trunk arranged so as to have one radiating surface exposed within the trunk and another radiating surface immediately exposed in the interior of the car so as to heat the same by direct radiation, said radiator having off-set portions, air discharge pipes leading from said air trunk opposite the off-set portions of the radiator, radiating loops in said discharge pipes which communicate with said radiator, and means for supplying said radiator with a heating medium.

14. The combination with a railway car, of means constituting an air trunk located within said car provided with an air inlet, said means comprising a radiator in said trunk arranged so as to have one radiating surface exposed within the trunk and another exposed immediately in the interior of the car so as to heat the car by direct radiation, said radiator composed of a plurality of radiator sections and nipples connecting the same, each radiator section provided with off-set portions, and discharge pipes leading from said air trunk opposite the off-set portions of said radiator sections.

15. The combination with a railway car, of a combined air trunk and radiator comprising radiator sections, means for connecting the same together, an angle bar which is secured to said radiator sections, and a top sheathing in fixed relation with a part of the car and having one edge bent over and engaged with said angle bar so as to form a slip joint therewith, said radiator sections having surfaces exposed immediately in the interior of the car so as to heat the same by direct radiation, means for introducing air into the space inclosed by the radiator and sheathing, and means for discharging the air heated in said space into the interior of the car.

16. The combination with a railway car, of a plurality of radiator sections arranged along the side of the car, pipes connecting said sections together, inclosing means which incloses said radiator sections on all sides but so as to leave one surface of each of said radiator sections exposed to the interior of the car so as to heat the same by direct radiation, and air discharge pipes which lead toward the center of the car from said inclosing means opposite the connecting pipes between said radiator sections, and means whereby a current of cool air is introduced into the inclosed space adjacent said radiation sections only when the air is in motion.

17. The combination with a railway car, of a radiator located along the wall of the car, means comprising said radiator which constitutes an air passage way intervening between the inner side of said radiator and the wall of the car, which passageway is inclosed except as hereinafter specified; the surface of said radiator opposite its inner side being exposed directly in the interior of the car so as to impart heat to the same by radiation; and discharge pipes secured to said exposed surface of said radiator and extending into the center of the car; said radiator being constructed, at the places at which said discharge pipes are attached thereto, so as to provide spaces for the passage of air from said inclosed air passageway back of the radiator into the several discharge pipes, said air passageway being provided with air inlets, and means for forcing cool air into said passageway, only while the car is in motion.

18. The combination with a railway car, of a radiator located therein, means comprising said radiator which constitutes an air passageway along one side of said radiator which is inclosed except as hereinafter specified; one surface of said radiator being exposed directly in the interior of the car so as to heat the same by direct radiation; and discharge pipes which lead from said air passageway at intervals along the same; said radiator being constructed at the places adjacent said discharge pipes so as to provide spaces for the passage of air from the inclosed air passageway into said discharge pipes, and means for automatically forcing air from outside of the car at intervals through said air passageway and discharge pipes.

19. The combination with a railway car, of a radiator which extends along and near the side wall of the car near the floor, means which incloses the space between said radiator and said wall and floor so as to constitute thereof an air passageway entirely inclosed except as hereinafter specified, but which leaves a surface of said radiator exposed in the interior of the car so as to heat the region adjacent thereto by direct radiation, said air passageway being provided with air inlets; air discharge pipes, arranged at intervals along said radiator, which are in communication with the air passageway back of said radiator and extend substantially to the center of the car, and which afford means whereby the air heated in said air passageway is discharged into the center portion of the car; an air duct under the car with which said air inlets are in communication, and means for forcing air into said air duct only when the car is in motion.

20. The combination with a railway car, of a radiator arranged along and near a side wall of the car near the floor, means which wholly incloses the space between the radiator and said wall and floor, except as hereinafter specified, so as to constitute an air passageway, one surface of the radiator being exposed in said passageway and another surface of the radiator being exposed in the interior of the car, air discharge pipes leading from the interior of said air passageway toward the center of the car, an air inlet leading from the external atmosphere at a point substantially above the outlets from said discharge pipes to the interior of said air passageway, and means communicating with said air inlet whereby a current of air will be forced through said inlet into said passageway and through said discharge pipes to the interior of the car when the car is in motion, but will not normally be so forced when the car is at rest, all so arranged that when the car is at rest it will be heated by direct radiation from the surface of the radiator exposed in the car, during which period there will be no appreciable outflow from said discharge pipes into the car, but when the car is in motion a volume of fresh air will be forced through said passageway across the surface of the radiator exposed in said passageway and thence through said discharge pipes to the interior of the car.

EGBERT H. GOLD.

Witnesses:
P. H. TRUMAN,
H. L. PECK.